United States Patent
Desrousseaux et al.

(10) Patent No.: US 7,632,555 B2
(45) Date of Patent: *Dec. 15, 2009

(54) INKJET RECORDING ELEMENT

(75) Inventors: Stephanie V. Desrousseaux, Chalon-sur-Saone (FR); Olivier J. Poncelet, Chalon-sur-Saone (FR)

(73) Assignee: Eastman Kodak Company, Rochester, NY (US)

( * ) Notice: Subject to any disclaimer, the term of this patent is extended or adjusted under 35 U.S.C. 154(b) by 339 days.

This patent is subject to a terminal disclaimer.

(21) Appl. No.: 10/583,528

(22) PCT Filed: Dec. 3, 2004

(86) PCT No.: PCT/EP2004/013753

§ 371 (c)(1), (2), (4) Date: Jun. 16, 2006

(87) PCT Pub. No.: WO2005/058604

PCT Pub. Date: Jun. 30, 2005

(65) Prior Publication Data

US 2007/0104900 A1    May 10, 2007

(30) Foreign Application Priority Data

Dec. 19, 2003  (FR) .................................. 03 1495

(51) Int. Cl.
- *B41M 5/00* (2006.01)
- *G03C 1/85* (2006.01)
- *C01B 39/00* (2006.01)

(52) U.S. Cl. .............. 428/32.28; 428/32.27; 428/32.34; 430/530; 430/631; 423/710

(58) Field of Classification Search .............. 428/32.28, 428/32.34, 32.27; 430/530, 631; 423/700–718
See application file for complete search history.

(56) References Cited

U.S. PATENT DOCUMENTS

| | | | | |
|---|---|---|---|---|
| 3,816,342 A | * | 6/1974 | Plank et al. | 502/65 |
| 5,888,711 A | * | 3/1999 | Poncelet et al. | 430/527 |
| 6,548,149 B1 | * | 4/2003 | Liu et al. | 428/195.1 |
| 2007/0218221 A1 | * | 9/2007 | Friour et al. | 428/32.17 |
| 2008/0055383 A1 | * | 3/2008 | Poncelet et al. | 347/106 |
| 2008/0305284 A1 | * | 12/2008 | Poncelet | 428/32.1 |

FOREIGN PATENT DOCUMENTS

| | | |
|---|---|---|
| EP | 0976571 | 2/2000 |
| EP | 1162076 | 5/2000 |
| EP | 1 184 193 A2 * | 3/2002 |
| WO | WO2004039724 | 5/2004 |

* cited by examiner

*Primary Examiner*—Betelhem Shewareged
(74) *Attorney, Agent, or Firm*—J. Jeffrey Hawley; Arthur E. Kluegel; Andrew J. Anderson

(57) ABSTRACT

The present invention relates to a recording element intended for forming images by inkjet printing having very good colorfastness over time and a good ink drying time. Said recording element comprises a support and at least one ink-receiving layer, said ink-receiving layer comprising at least one hydrosoluble binder and at least one aluminosilicate polymer capable of being obtained according to a preparation method consisting in treating an aluminum halide with an alkyl orthosilicate only having hydrolyzable functions with an aqueous alkali in the presence of silanol groups, the aluminum concentration being maintained at less than 0.3 mol/l, the Al/Si molar ratio being maintained between 1 and 3.6 and the alkali/Al molar ratio being maintained between 2.3 and 3; and then stirring the resulting mixture at ambient temperature in the presence of silanol groups for long enough to form the aluminosilicate polymer; and then adding at least one aluminum chelating agent to the aluminosilicate polymer, the molar ratio between the chelating functions of the chelating agent and the aluminum of the aluminosilicate polymer being greater than or equal to 1.

17 Claims, 6 Drawing Sheets

INKJET RECORDING ELEMENT

FIELD OF THE INVENTION

The present invention relates to an inkjet recording element.

BACKGROUND OF THE INVENTION

Digital photography has been growing fast for several years and the general public now has access to efficient and reasonably priced digital cameras. Therefore people are seeking to be able to produce photographic prints from a simple computer and its printer, with the best possible quality.

Many printers, especially those linked to personal office automation, use the inkjet printing technique. There are two major families of inkjet printing techniques: continuous jet and drop-on-demand.

Continuous jet is the simpler system. Pressurized ink ($3 \cdot 10^5$ Pa) is forced to go through one or more nozzles so that the ink is transformed into a flow of droplets. In order to obtain the most regular possible sizes and spaces between drops, regular pressure pulses are sent using for example a piezoelectric crystal in contact with the ink with high frequency (up to 1 MHz) alternating current (AC) power supply. So that a message can be printed using a single nozzle, every drop must be individually controlled and directed. Electrostatic energy is used for this: an electrode is placed around the ink jet at the place where drops form. The jet is charged by induction and every drop henceforth carries a charge whose value depends on the applied voltage. The drops then pass between two deflecting plates charged with the opposite sign and then follow a given direction, the amplitude of the movement being proportional to the charge carried by each of them. To prevent other drops from reaching the paper, they are left uncharged: so, instead of going to the support they continue their path without being deflected and go directly into a container. The ink is then filtered and can be reused.

The other category of inkjet printer is drop-on-demand (DOD). This constitutes the base of inkjet printers used in office automation. With this method, the pressure in the ink cartridge is not maintained constant but is applied when a character has to be formed. In one widespread system there is a row of 12 open nozzles, each of them being activated with a piezoelectric crystal. The ink contained in the head is given a pulse: the piezo element contracts with an electric voltage, which causes a decrease of volume, leading to the expulsion of the drop by the nozzle. When the element resumes its initial shape, it pumps in the reservoir the ink necessary for new printings. The row of nozzles is thus used to generate a column matrix, so that no deflection of the drop is necessary. One variation of this system consists in replacing the piezoelectric crystals by small heating elements behind each nozzle. The drops are ejected following the forming of bubbles of solvent vapor. The volume increase enables the expulsion of the drop. Finally, there is a pulsed inkjet system in which the ink is solid at ambient temperature. The print head thus has to be heated so that the ink liquefies and can print. This enables rapid drying on a wider range of products than conventional systems.

There now exist new "inkjet" printers capable of producing photographic images of excellent quality. However, they cannot supply good proofs if inferior quality printing paper is used. The choice of printing paper is fundamental for the quality of the obtained image. The printing paper must combine the following properties: high quality printed image, rapid drying after printing, good dye keeping in time, smooth appearance, and high gloss.

In general, the printing paper comprises a support coated with one or more layers according to the properties required. It is possible, for example, to apply on a support a primary attachment layer, an absorbent layer, an ink dye fixing layer and a protective layer or surface layer to provide the glossiness of the recording element. The absorbent layer absorbs the liquid part of the water-based ink composition after creation of the image. Elimination of the liquid reduces the risk of ink migration at the surface. The ink dye fixing layer prevents any dye loss into the fibers of the paper base to obtain good color saturation while preventing excess ink that would encourage the increase in size of the printing dots and reduce the image quality. The absorbent layer and fixing layer can also constitute a single ink-receiving layer ensuring both functions. The protective layer is designed to ensure protection against fingerprints and the pressure marks of the printer feed rollers. The ink-receiving layer usually comprises a binder, a receiving agent and various additives. The purpose of the receiving agent is to fix the dyes in the printing paper. The best-known inorganic receivers are colloidal silica or boehmite. For example, the European Patent Applications EP-A-976,571 and EP-A-1,162,076 describe recording elements for inkjet printing in which the ink-receiving layer contains as inorganic receivers Ludox™ CL (colloidal silica) marketed by Grace Corporation or Dispal™ (colloidal boehmite) marketed by Sasol. However, printing paper comprising an ink-receiving layer containing such inorganic receivers can have poor image stability in time, which is demonstrated by a loss of color density.

To meet the new requirements of the market in terms of photographic quality, printing speed and color stability, it is necessary to offer a new inkjet recording element having the properties as defined above, more particularly good dye keeping properties while keeping instant dryness.

SUMMARY OF THE INVENTION

The new inkjet recording element according to the present invention, comprises a support and at least one ink-receiving layer, and is characterized in that said ink-receiving layer comprises at least one hydrosoluble binder and at least one aluminosilicate polymer obtainable by a preparation method that comprises the following steps:

a) treating a mixed aluminum and silicon alkoxide only comprising hydrolyzable functions, or a mixed aluminum and silicon precursor resulting from the hydrolysis of a mixture of aluminum compounds and silicon compounds only comprising hydrolyzable functions, with an aqueous alkali, in the presence of silanol groups, the aluminum concentration being maintained at less than 0.3 mol/l, the Al/Si molar ratio being maintained between 1 and 3.6 and the alkali/Al molar ratio being maintained between 2.3 and 3;

b) stirring the mixture resulting from step a) at ambient temperature in the presence of silanol groups long enough to form the aluminosilicate polymer;

c) eliminating the byproducts formed during steps a) and b) from the reaction medium; and d) adding at least one chelating agent of aluminum to the aluminosilicate polymer, the molar ratio between the chelating functions of the chelating agent and the aluminum of the aluminosilicate polymer being greater than or equal to 1.

Throughout the present description, the expression "hydrolyzable function" means a substituent eliminated by hydrolysis during the process and in particular at the time of treatment with the aqueous alkali. In the following, the expression "unmodified mixed aluminum and silicon alkoxide" or "unmodified mixed aluminum and silicon precursor" means respectively a mixed aluminum and silicon alkoxide only having hydrolyzable functions, or a mixed aluminum and silicon precursor resulting from the hydrolysis of a mixture of aluminum compounds and silicon compounds only having hydrolyzable functions. More generally, an "unmodified" compound is a compound that only comprises hydrolyzable substituents.

The inkjet recording element according to the present invention has improved dye keeping properties in time as well as an improved instant dryness compared with the inkjet recording elements available on the market.

DETAILED DESCRIPTION OF THE INVENTION

Figure 1:
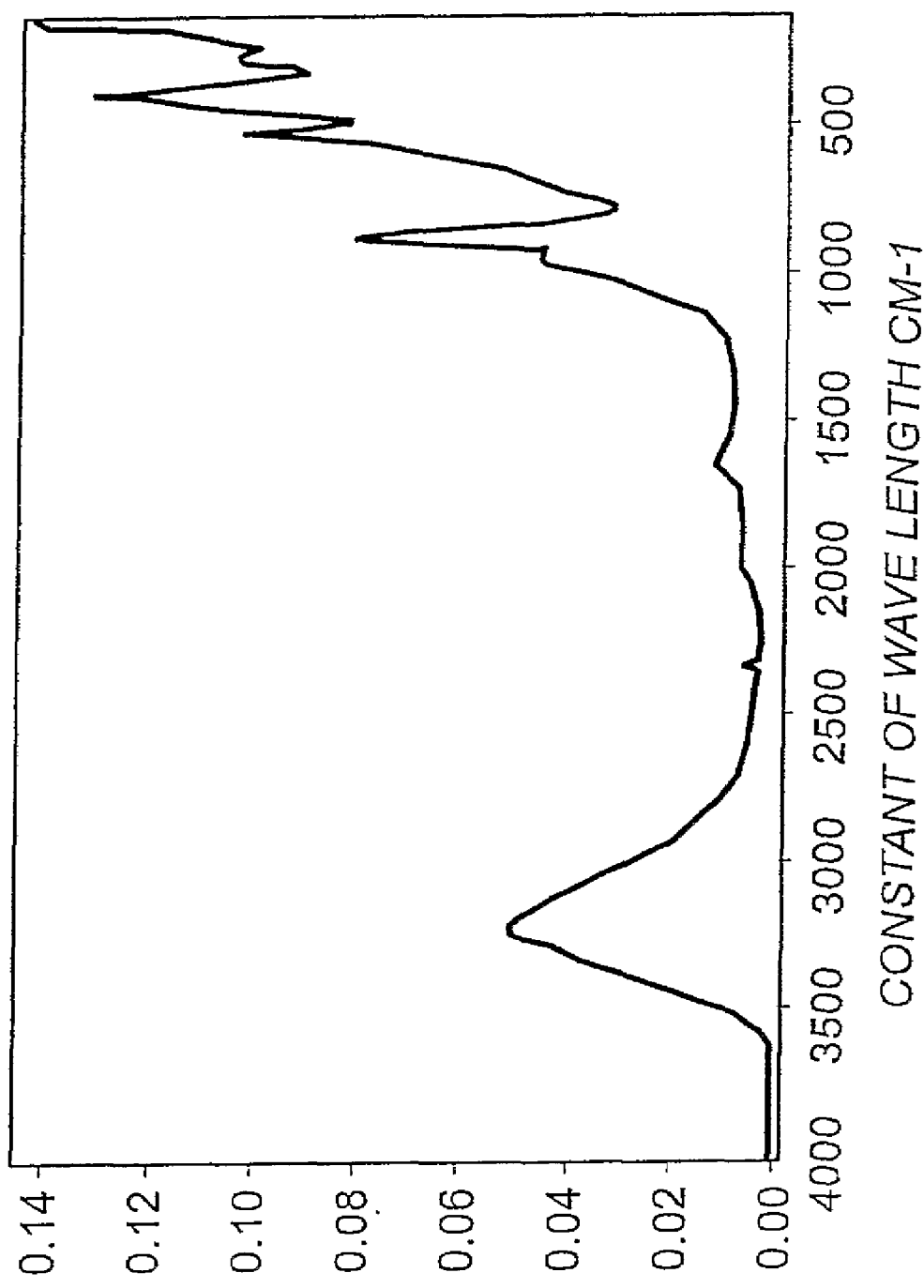
FIG. 1 represents the spectrum obtained by Raman spectroscopy of the aluminosilicate polymers used to prepare the aluminosilicate polymers used in the present invention.

The inkjet recording element according to the present invention comprises firstly a support. This support is selected according to the desired use. It can be a transparent or opaque thermoplastic film, in particular a polyester base film such as polyethylene terephthalate or polymethylmethacrylate; cellulose derivatives, such as cellulose ester, cellulose triacetate, cellulose diacetate; polyacrylates; polyimides; polyamides; polycarbonates; polystyrenes; polyolefines; polysulfones; polyetherimides; vinyl polymers such as polyvinyl chloride; and their mixtures. The support used in the invention can also be paper, both sides of which may be covered with a polyethylene layer. When the support comprising the paper pulp is coated on both sides with polyethylene, it is called Resin Coated Paper (RC Paper) and is marketed under various brand names. This type of support is especially preferred to constitute an inkjet recording element. The side of the support that is used can be coated with a very thin layer of gelatin or another composition to ensure the adhesion of the first layer on the support.

The inkjet recording element according to the invention then comprises at least one ink-receiving layer comprising at least one hydrosoluble binder. Said hydrosoluble binder can be gelatin or polyvinyl alcohol. The gelatin is that conventionally used in the photographic field. Such a gelatin is described in Research Disclosure, September 1994, No. 36544, part IIA. *Research Disclosure* is a publication of Kenneth Mason Publications Ltd., Dudley House, 12 North Street, Emsworth, Hampshire PO10 7DQ, United Kingdom. The gelatin can be obtained from SKW and the polyvinyl alcohol from Nippon Gohsei, or Alfa Aesar.

According to the present invention, the ink-receiving layer comprises, as receiving agent, at least one aluminosilicate polymer obtainable by a preparation method comprising the following steps:

a) treating a mixed aluminum and silicon alkoxide only comprising hydrolyzable functions, or a mixed aluminum and silicon precursor resulting from the hydrolysis of a mixture of aluminum compounds and silicon compounds only comprising hydrolyzable functions, with an aqueous alkali, in the presence of silanol groups, the aluminum concentration being maintained at less than 0.3 mol/l, the Al/Si molar ratio being maintained between 1 and 3.6 and the alkali/Al molar ratio being maintained between 2.3 and 3;

b) stirring the mixture resulting from step a) at ambient temperature in the presence of silanol groups long enough to form the aluminosilicate polymer;

c) eliminating the by products formed during steps a) and b) from the reaction medium; and d) adding at least one chelating agent of aluminum to the aluminosilicate polymer, the molar ratio between the chelating functions of the chelating agent and the aluminum of the aluminosilicate polymer being greater than or equal to 1.

According to one embodiment, the unmodified mixed aluminum and silicon precursor can be formed in situ by mixing in aqueous medium (i) one compound selected from the group consisting of aluminum salts, aluminum alkoxides and aluminum halogenoalkoxides and (ii) at least one compound selected from the group consisting of unmodified silicon alkoxides and chloroalkoxides. The alkoxide radical of the unmodified aluminum compound or silicon compound preferably contains 1 to 5 carbon atoms, such as methoxide, ethoxide, n-propoxide, or i-propoxide.

Preferably, an aluminum salt, such as a halide (e.g. chloride or bromide), a perhalogenate, a sulfate, a nitrate, a phosphate or a carboxylate, and at least one unmodified silicon alkoxide, such as tetramethyl or tetraethyl orthosilicate is used.

A single unmodified silicon alkoxide or a mixture of unmodified silicon alkoxides, or a single unmodified silicon chloroalkoxide or a mixture of unmodified silicon chloroalkoxides, or a mixture of unmodified silicon alkoxides and chloroalkoxides can be used.

Preferably, an aluminum halide, such as chloride, and an unmodified silicon alkoxide is used. In practice, the mixture is made at ambient temperature between 15° C. and 35° C., preferably between 20° C. and 25° C., by adding the silicon alkoxide, pure or diluted in a co-solvent such as an alcohol, to the aluminum salt in aqueous solution, with stirring, until a clear homogeneous mixture is obtained. An unmodified mixed aluminum and silicon precursor is thus obtained. The stirring time varies from 10 to 180 minutes, and is preferably 120 minutes.

According to step a) of the method for preparing the aluminosilicate polymer useful in this invention, the precursor or an unmodified mixed aluminum and silicon alkoxide is then put in contact with an aqueous alkali, the aluminum concentration being maintained at less than 0.3 mol/l, the Al/Si molar ratio being maintained between 1 and 3.6, and the alkali/Al molar ratio being maintained between 2.3 and 3. Advantageously, the aluminum concentration is between $1.5 \times 10^{-2}$ and 0.3 mol/l and even more preferably between $4.4 \times 10^{-2}$ and 0.3 mol/l. Preferably, the Al/Si molar ratio is between 1 and 2.

Preferably, an aqueous solution of sodium, potassium, or lithium hydroxide, diethylamine or triethylamine, with a concentration between 0.5 M and 3 M, and preferably 3 M is used. The alkali can also be in the form of a hydroalcoholic solution.

The alkali is added to the precursor or to the unmodified mixed aluminum and silicon alkoxide at a rate preferably between 50 and 650 mmole/hour.

The alkali in step a) is added in the presence of silanol groups. These groups can be supplied by glass or silica (glass wool) particles or beads, which have superficial hydroxy groups. When the volume of liquid to be treated is large, it may be desirable to increase the quantity of beads. The diameter of the beads can be between 0.2 and 5 mm and preferably between 1 and 3 mm. To simplify the implementation of the method for preparing the aluminosilicate polymer useful in the present invention, the preparation of the mixed aluminum and silicon precursor can also be performed in the presence of silanol groups, for example by circulating the mixture in a bed of glass beads.

After the addition of the alkali, step b) of the method for preparing the aluminosilicate polymer useful in the present invention consists in stirring the mixture resulting from step a) at ambient temperature in the presence of silanol groups long enough to form said aluminosilicate polymer.

Then, step c) of the method for preparing the aluminosilicate polymer useful in the present invention consists in eliminating from the reaction medium the byproducts formed during steps a) and b), such as the residual ions coming essentially from the alkali used in step a). The residual ions can be eliminated by washing, by successive sedimentation or by diafiltration. The aluminosilicate polymer recording element resulting from step c) can then be concentrated by centrifugation or nanofiltration.

In a first embodiment of the method for preparing the aluminosilicate polymer useful in the present invention, during step a) a quantity of alkali is added in order to obtain an alkali/Al molar ratio of about 2.3. In this case the pH is maintained between 4 and 5, and preferably between 4.2 and 4.3. Then step b) as described above is applied. The aluminosilicate polymer useful in the present invention is thus obtained in a dispersion form. Step c) to eliminate the residual ions can then be performed by diafiltration, followed by nanofiltration concentration.

In a second embodiment of the method for preparing the aluminosilicate polymer useful in the present invention, during step a) a quantity of alkali is added in order to obtain an alkali/Al molar ratio of about 3. Then step b) as described above is applied. The aluminosilicate polymer useful in the present invention is thus obtained in a suspension form. Step c) to eliminate the residual ions can then be performed by diafiltration, followed by nanofiltration concentration, the aluminosilicate polymer having been previously redispersed by adding acid, such as hydrochloric or acetic acid or a mixture thereof.

In a third embodiment, the method for preparing the aluminosilicate polymer useful in the present invention comprises an additional step e), after step b) and before step c). Said step e) consists in adding in a few minutes an additional quantity of aqueous alkali to reach an alkali/Al molar ratio of 3 if this ratio had not already been reached during step a). The aluminosilicate polymer useful in the present invention is thus obtained in a suspension form. Step c) to eliminate the residual ions can then be performed by diafiltration, followed by nanofiltration concentration, the aluminosilicate polymer having been previously redispersed by adding hydrochloric acid. Step c) can also be performed by washing with osmosed water by successive sedimentations, followed by centrifugation concentration.

The aluminosilicate polymer resulting from step c) followed by a concentration has physical gel form. The Al/Si molar ratio is between 1 and 3.6. Such a polymer is described in Patent Application WO 03/07579.

The preparation method of aluminosilicate polymer useful in the present invention also comprises a step d) according to which at least one chelating agent of aluminum is added to the aluminosilicate polymer, the molar ratio between the chelating functions of the chelating agent and the aluminum of the aluminosilicate polymer being greater than or equal to 1. Step d) can be applied directly to the aluminosilicate polymer resulting from step b) or from step c). Preferably, step d) is applied directly to the aluminosilicate polymer resulting from step c). The mixture is then stirred. Subsequent vacuum evacuation enables the aluminosilicate polymer useful in the present invention to be obtained in a solid form.

Said chelating agent of aluminum can be selected from the group consisting of carboxylic acids, phosphonic acids, phosphinic acids, sulfonic acids, difunctional acids, their esters and anhydrides, and amino acids. Preferably, said chelating agent of aluminum is selected from the group consisting of HCOOH, $R_1COOH$, where $R_1$ is selected from the group consisting of $CH_3(CH_2)_n$, n being between 0 and 12, $CF_3$, $C_6H_5$, $(C_6H_5)_2$, substituted aromatic rings, $C_4H_4S$; $R_2PO(OH)_2$ where $R_2$ is selected from the group consisting of $CH_3$, $C_6H_5$; $R_3SO_3H$ where $R_3$ is $CH_3(CH_2)_n$, n being between 0 and 5; $HOOC(CH_2)_nCOOH$, n=0-8; aromatic difunctional acids; $HOOC(CH_2)_nPO(OH)_2$, n=2, 4; aliphatic hydroxy acids; $HOOC(CH_2OH)_nCOOH$, n=1-2; $CH_3CH(NH_2)COOH$. The chelating agent of aluminum is preferably acetic acid.

The solvent used for the chelating agent of aluminum is generally water but other solvents miscible to water can be used to solubilize the chelating agent before its adding to the aluminosilicate polymer resulting from step c).

Step d) can be also applied at the moment of preparing the coating composition for the ink-receiving layer using an aluminosilicate polymer resulting from step c), and preferably lyophilized.

Step d) can comprise a first adding of acetic acid and a following adding of another chelating agent of aluminum. This method is particularly useful to improve the chelation when the chelating agent comprises large bulky groups with hydrophobic character.

The amount of chelating agent of aluminum corresponds to a molar ratio between the chelating functions of the chelating agent and the aluminum of the aluminosilicate polymer. This molar ratio is greater than or equal to 1. Preferably, it is between 1 and 4. Preferably, it is greater than or equal to 2 when step d) is applied directly to the aluminosilicate polymer resulting from step c) to prepare an aluminosilicate polymer resulting from step d).

Introducing a chelating agent of aluminum enables the surface of the aluminosilicate polymer to be modified by forming a chelate. The functional group of the chelating agent enables increased affinity of the aluminosilicate polymer with the medium in which it is used. In addition, it was demonstrated that in the presence of an aluminosilicate polymer/chelating agent/hydrosoluble binder ternary system and when the molar ratio between the chelating functions of the chelating agent and the aluminum of the aluminosilicate polymer is greater than or equal to 1, it forms in the ink-receiving layer aggregates enabling the porosity of the layer to be increased and thus the ink drying speed. The aggregates are not present in the coating composition intended to be coated on the support to constitute the ink-receiving layer, but only form during the drying.

The aluminosilicate polymer useful in the present invention resulting from step d) has physical gel form. The Al/Si molar ratio is between 1 and 3.6.

Subsequent lyophilization enables the aluminosilicate polymer useful in the present invention to be obtained as a powder. Such an aluminosilicate polymer can be characterized in that its Raman spectrum comprises in spectral region 200-600 $cm^{-1}$ a wide band at 250±6 $cm^{-1}$, a wide intense band at 359±6 $cm^{-1}$, a shoulder at 407±7 $cm^{-1}$, and a wide band at 501±6 $cm^{-1}$, as well as bands characterizing the chelating agent in its chelate form, the Raman spectrum being produced for the aluminosilicate polymer resulting from step d) and lyophilized.

The ink-receiving layer comprises from 5 to 95 percent by weight of aluminosilicate polymer compared with the total weight of the dry state ink-receiving layer.

To produce the coating composition intended to be coated onto the support to constitute the ink-receiving layer of the inkjet recording element described above, the hydrosoluble binder is diluted in water to adjust its viscosity and facilitate its coating. The composition then has the form of an aqueous solution or a dispersion containing all the necessary components. When the aluminosilicate polymer as obtained above is used for preparing the composition as a powder, this powder must be very fine.

The composition can also comprise a surfactant to improve its coating properties. The composition can be coated on the support according to any appropriate coating method, such as blade, knife or curtain coating. The composition is applied with a thickness approximately between 20 and 300 μm in the wet state, preferably between 100 and 300 μm and preferably 200 μm. The composition forming the ink-receiving layer can be applied to both sides of the support. It is also possible to provide an antistatic or anti-winding layer on the back of the support coated with the ink-receiving layer.

The inkjet recording element according to the invention can comprise, besides the ink-receiving layer described above, other layers having another function, arranged above or below said ink-receiving layer. The ink-receiving layer as well as the other layers can comprise any other additive known to those skilled in the art to improve the properties of the resulting image, such as UV ray absorbers, optical brightening agents, antioxidants, plasticizers, etc.

The ink-receiving layer useful in the present invention has a thickness generally between 1 μm and 50 μm in the dry state. The inkjet recording element comprising such an ink-receiving layer has improved dye keeping properties in time as well as an improved instant dryness. It can be used for any type of inkjet printer as well as for all the inks developed for this technology.

The following examples illustrate the present invention without however limiting the scope.

1) Preparation of Various Aluminosilicate Polymers

Synthesis No. 1

An aluminosilicate polymer was prepared and used to prepare the aluminosilicate polymers used in the present invention. Such an aluminosilicate polymer is described in Patent Application WO 03/07579.

4.53 moles $AlCl_3$, $6H_2O$, then 2.52 moles tetraethyl orthosilicate were added to 100 l osmosed water. This mixture was stirred and circulated simultaneously through a bed formed of 1 kg of glass beads 2-mm diameter using a pump with 8 l/min output. The preparation operation of the non-modified mixed aluminum and silicon precursor lasted 60 minutes. Then, according to step a) of the method for preparing the aluminosilicate polymer used in the present invention, 10.5 moles NaOH 3M were added to the precursor in two hours. The reaction medium clouded. According to step b) of the preparation method, the mixture was stirred for 18 hours. The medium became clear. The circulation was stopped in the glass bead bed. Then, according to step e) of the preparation method, 3.09 moles NaOH 3M were added in ten minutes. The aluminum concentration was $4.4 \times 10^{-2}$ mol/l, Al/Si molar ratio 1.8 and alkali/Al ratio 3. The aluminosilicate polymer was thus obtained in suspension form. This polymer was identified by its Raman signature, represented by FIG. 1, the polymer having been lyophilized to obtain its Raman signature.

In all the examples described, a Raman Bruker RFS 100 spectrometer (laser exciting wavelength 1064 nm, power 800 mW and 512 scans) was used to obtain the Raman spectra. The spectra were acquired in reflection mode (180°) using a lens with semi-cylindrical mirror. Samples were analyzed in solid form (obtained by lyophilization) without special preparation. The Raman spectrum was preferred to the infrared spectrum, because the recording elements used in the present invention were water rich and the infrared spectrum of the recording element was then masked by the water. This problem did not appear with the Raman spectra technology. Recording elements that have the same Raman signature belong to the same family.

Step c) of the preparation method consisted in leaving the polymer suspension to settle for 24 hours, then in discarding the supernatant to recover the sediment. Then 166 g HCl at 37 percent, previously diluted 10 times, were added to the sediment to obtain a dispersion of the aluminosilicate polymer. The dispersion was then diafiltrated using a Filmtec NF 2540 nanofiltration membrane (surface area 6 $m^2$) to eliminate the sodium salts to achieve an Al/Na ratio greater than 100. The retentate resulting from the diafiltration by nanofiltration was concentrated to obtain a gel with about 20% by weight of aluminosilicate polymer.

Synthesis No. 2

An aluminosilicate polymer used in the present invention was prepared with an initial molar ratio between the chelating functions of the chelating agent and the aluminum of the aluminosilicate polymer of 2.

The preparation method of synthesis No. 1 was reproduced. 100 g of the aluminosilicate polymer gel obtained by the synthesis No. 1 was used (quantity of aluminum=1.54 g, 57 mmole, measured by atomic emission spectroscopy, plasma source with inductive coupling (ICP-AES)) and this gel was diluted in 100 g of osmosed water. Then, according to step d) of the preparation method, 6.8 g (114 mmole) glacial acetic acid were added to the gel. The molar ratio between chelating functions of the acetic acid and the aluminum of the aluminosilicate polymer was 2. The mixture was stirred for two days. The excess water and acetic acid was vacuum distilled at 35° C. A white powder was obtained.

The Raman spectrum of this aluminosilicate polymer shows the characteristic bands of the aluminosilicate polymer obtained by synthesis No. 1 as well as the characteristic bands of the chelating agent in acetate form.

Synthesis No. 3

An aluminosilicate polymer used in the present invention was prepared with an initial molar ratio between the chelating functions of the chelating agent and the aluminum of the aluminosilicate polymer of 1.

The preparation method of synthesis No. 1 was reproduced. 18 g of the aluminosilicate polymer gel obtained by the synthesis No. 1 was used (quantity of aluminum=425 mg, 15 mmole, measured by ICP-AES) and the gel was diluted in 8.8 g of osmosed water. Then, according to step d) of the preparation method, 1.4 g (15 mmole) phosphonic methyl acid were added to the gel. The molar ratio between chelating functions of the phosphonic methyl acid and the aluminum of the aluminosilicate polymer was 1. The mixture was stirred for two days. The excess water was vacuum distilled at 35° C. A white powder was obtained.

The Raman spectrum of this aluminosilicate polymer shows the characteristic bands of the aluminosilicate polymer obtained by the synthesis No. 1 as well as the characteristic bands of the chelating agent in phosphonate form.

Synthesis No. 4

An aluminosilicate polymer used in the present invention was prepared with an initial molar ratio between the chelating functions of the chelating agent and the aluminum of the aluminosilicate polymer of 1.

The preparation method of synthesis No. 1 was reproduced. 20 g of the aluminosilicate polymer gel obtained by the synthesis No. 1 was used (quantity of aluminum=798 mg, 29.5 mmole, measured by ICP-AES) and the gel was diluted in 20 g of osmosed water. Then, according to step d) of the preparation method, 2.8 g (29.5 mmole) sulfonic methyl acid were added to the gel. The molar ratio between chelating functions of the phosphonic methyl acid and the aluminum of the aluminosilicate polymer was 1. The mixture was stirred for two days. The excess water was vacuum distilled at 35° C. A white powder was obtained.

The Raman spectrum of this aluminosilicate polymer shows the characteristic bands of the aluminosilicate polymer obtained by the synthesis No. 1 as well as the characteristic bands of the chelating agent in sulfonate form.

Synthesis No. 5

An aluminosilicate polymer used in the present invention was prepared with an initial molar ratio between the chelating functions of the chelating agent and the aluminum of the aluminosilicate polymer of 2.

The preparation method of synthesis No. 1 was reproduced. 50 g of the aluminosilicate polymer gel obtained by the synthesis No. 1 was used (quantity of aluminum=1.23 g, 45.5 mmole, measured by ICP-AES) and the gel was diluted in 25 g of osmosed water. Then, according to step d) of the preparation method, 9.3 g (91 mmole) valeric acid were added to the gel. The molar ratio between the chelating functions of the valeric acid and the aluminum of the aluminosilicate polymer was 2. The mixture was stirred for two days. The excess water was vacuum distilled at 35° C.

A white powder was obtained.

The Raman spectrum of this aluminosilicate polymer shows the characteristic bands of the aluminosilicate polymer obtained by the synthesis No. 1 as well as the characteristic bands of the chelating agent in carboxylate form.

Synthesis No. 6

For comparison, an aluminosilicate polymer as described in synthesis No. 2 was prepared but with an initial molar ratio between the chelating functions of the chelating agent and the aluminum of the aluminosilicate polymer of 0.5.

The preparation method of synthesis No. 1 was reproduced. 100 g of the aluminosilicate polymer gel obtained by the synthesis No. 1 was used (quantity of aluminum=1.54 g, 57 mmole, measured by ICP-AES) and the gel was diluted in 100 g of osmosed water. Glacial acetic acid (1.7 g, 28.5 mmole) was added to the gel. The molar ratio between chelating functions of the acetic acid and the aluminum of the aluminosilicate polymer was 0.5. The mixture was stirred for two days. The excess water and acetic acid was vacuum distilled at 35° C. A white powder was obtained.

The Raman spectrum of this aluminosilicate polymer shows the characteristic bands of the aluminosilicate polymer as obtained by the synthesis No. 1 as well as the characteristic bands of the chelating agent in acetate form.

2) Preparation of Coating Compositions Constituting an Ink-Receiving Layer Coated on a Support As hydrosoluble binder, polyvinyl alcohol was used with molecular weight greater than 100,000, hydrolysis rate 86% (Gohsenol™ GH23 marketed by Nippon Gohsei) diluted to 9% by weight in osmosed water. The compositions A include as receiving agent the aluminosilicate polymers prepared according to syntheses 2 to 6.

All the coating compositions A were obtained by mixing:
- 10.1 g osmosed water
- 2 g aluminosilicate polymer (dry matter)
- 2.7 g polyvinyl alcohol at 9% (PVA/aluminosilicate polymer ratio=0.12)

When the aluminosilicate polymer has powder form, the particles must first be crushed finely. The mixture was homogenized by shearing overnight.

The other coating compositions B and C were obtained directly by mixing the chelating agent and the aluminosilicate polymer obtained by the synthesis No. 1 at the time of preparing the coating composition before coating, with a molar ratio between the chelating functions of the chelating agent and the aluminum of the aluminosilicate polymer of 1.

The coating composition B was obtained by mixing:
- 9.15 g osmosed water
- 0.95 g glacial acetic acid (15.8 mmole)
- 2 g of aluminosilicate polymer of synthesis No. 1 (dry matter, 427 mg of aluminum, 15.8 mmole)
- 2.7 g polyvinyl alcohol at 9% (PVA/aluminosilicate polymer ratio=0.12)

When the aluminosilicate polymer has powder form, the particles must first be crushed finely. The mixture was homogenized by shearing overnight.

The coating composition C was obtained by mixing:
- 4.34 g osmosed water
- 0.76 g phosphonic methyl acid (7.9 mmole)
- 1 g of aluminosilicate polymer of synthesis No. 1 (dry matter,
- 213 mg of aluminum, 7.9 mmole)
- 1.35 g polyvinyl alcohol at 9% (PVA/aluminosilicate polymer ratio=0.12)

When the aluminosilicate polymer has powder form, the particles must first be crushed finely. The mixture was homogenized by shearing overnight.

3) Preparation of Inkjet Recording Elements

To do this, a Resin Coated Paper type support was placed on a coating machine, first coated with a very thin gelatin layer, and held on the coating machine by vacuum. This support was coated with a composition as prepared according to paragraph 2 using a blade. The wet thickness was 125 μm for examples 1, 2, 4 and 5, and 200 μm for examples 6 and 7. Then, it was left to dry for three hours at ambient air temperature (21° C.).

The resulting recording elements corresponded to the examples given in Table I below specifying the receiving agent used in the ink-receiving layer.

TABLE I

| Recording element | Composition | Receiving agent in the ink-receiving layer |
|---|---|---|
| Ex. 1 (inv.) | A | Aluminosilicate prepared as per synthesis No. 2 |
| Ex. 2 (inv.) | A | Aluminosilicate prepared as per synthesis No. 3 |
| Ex. 3 (inv.) | A | Aluminosilicate prepared as per synthesis No. 4 |
| Ex. 4 (inv.) | A | Aluminosilicate prepared as per synthesis No. 5 |
| Ex. 5 (comp.) | A | Aluminosilicate prepared as per synthesis No. 6 |
| Ex. 6 (inv.) | B | Aluminosilicate prepared as per synthesis No. 1 /acetic acid |

TABLE I-continued

| Recording element | Composition | Receiving agent in the ink-receiving layer |
|---|---|---|
| Ex. 7 (inv.) | C | Aluminosilicate prepared as per synthesis No. 1 /phosphonic methyl acid |

4) Evaluation of Dye Keeping Properties in Time

To evaluate the dye keeping properties in time, a dye fading test by exposure to ozone was performed for each resulting recording element. To do this, targets, comprising four colors (black, yellow, cyan and magenta) were printed on each recording element using a KODAK PPM 200 or an Epson 690 printer and related ink. The targets were analyzed using a GretagMacbeth™ Spectrolino spectrophotometer that measured the intensity of the various colors. Then the recording elements were placed in the dark in a room with controlled ozone atmosphere (60 ppb) for three weeks. Each week, any degradation of the color density was monitored using the spectrophotometer. If the density losses were less than 30 percent after three weeks, for all the colors, it was considered that the recording element enables particularly stable printing to be obtained.

Figure 2:
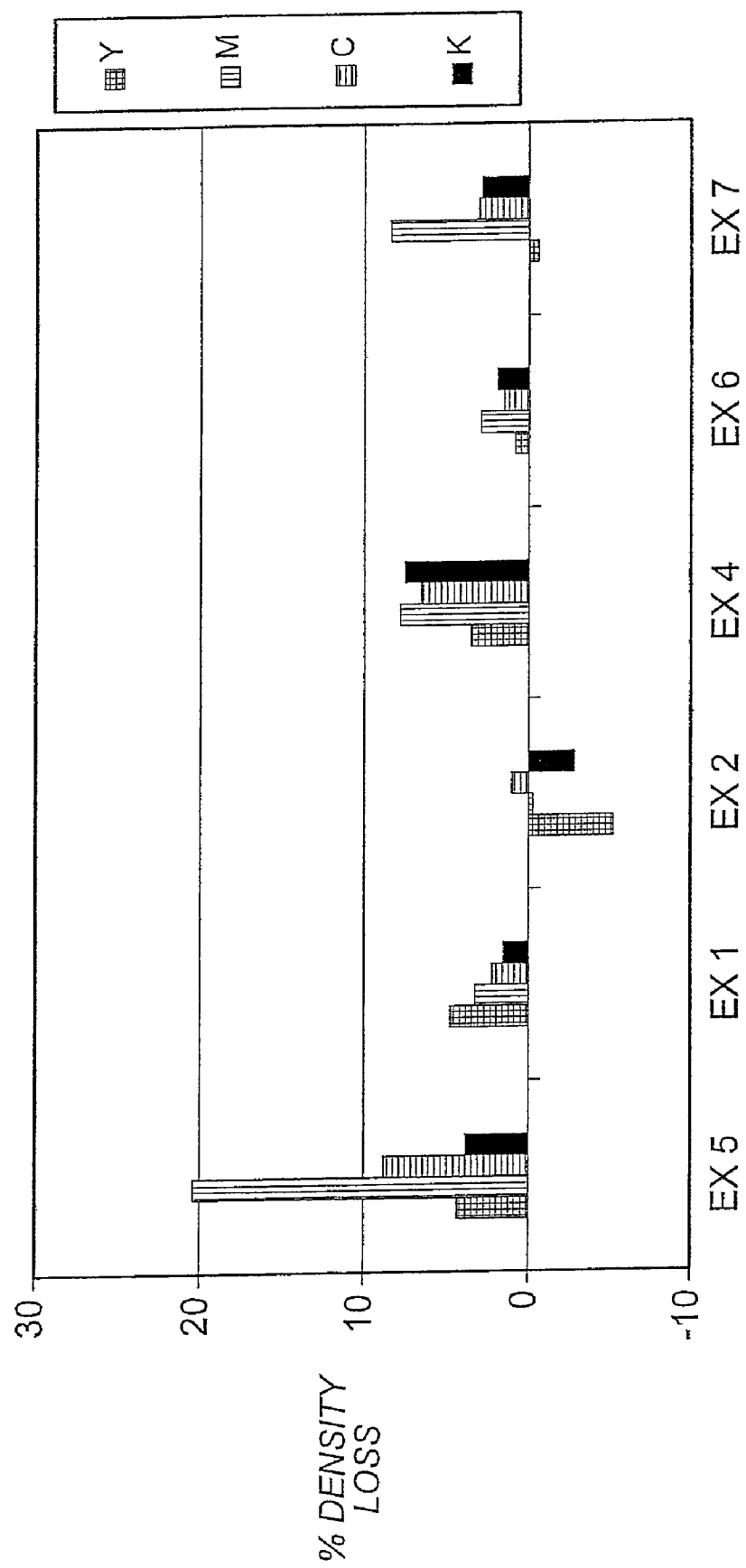
FIGS. 2, 3, 5 and 6 represent the percentage of color density loss for various comparative recording elements and according to the present invention when exposed to ozone.

FIG. 2 represents the percentage of density loss for the four colors of the target after three weeks for examples 1, 2 and 4 to 7 printed using the Kodak PPM 200 printer. For example 5, the percentage of density loss was observed for the original density of 0.5. For the other examples, the percentage of density loss was observed for the original density of 1.

Figure 3:
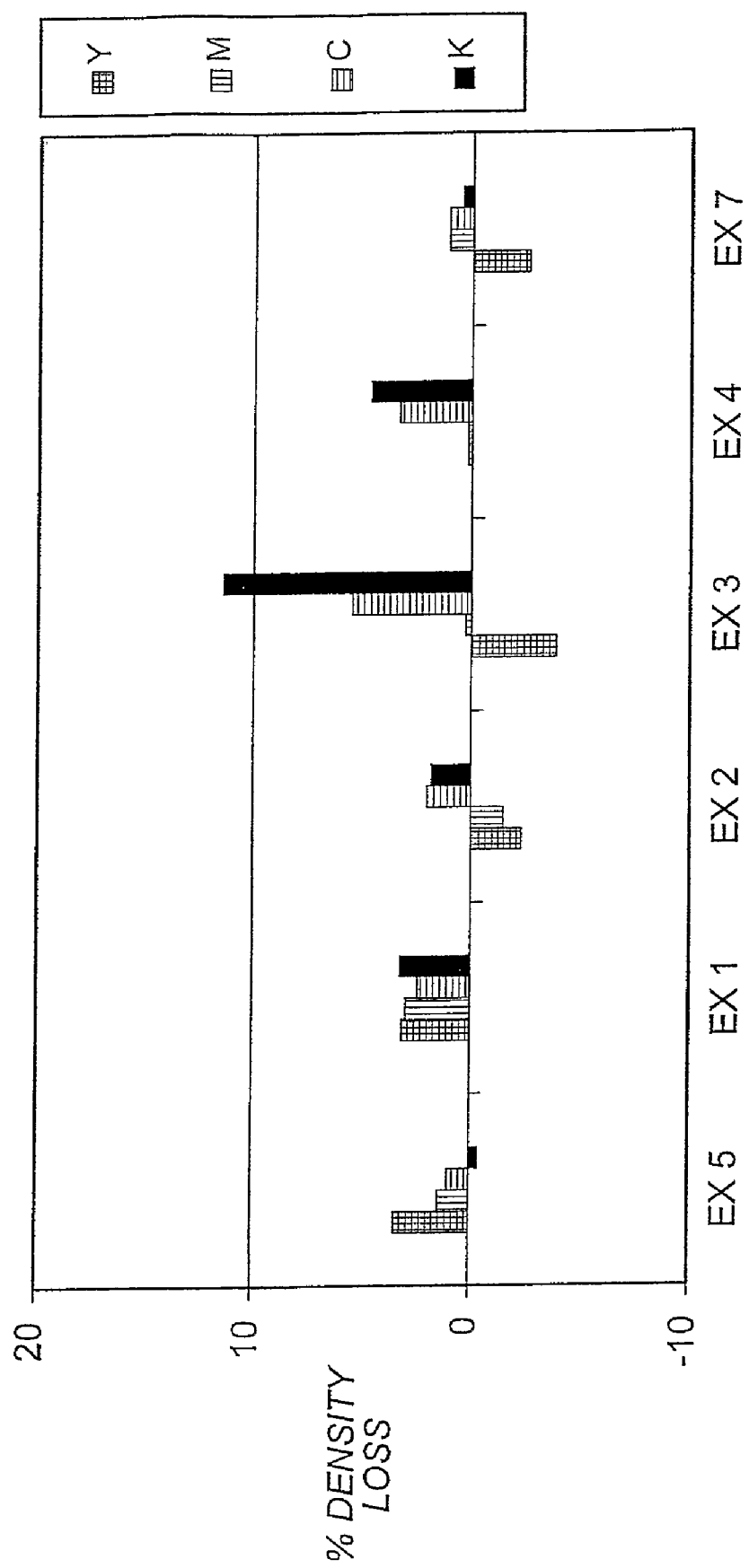

FIG. 3 represents the percentage of density loss for the four colors of the target after three weeks for examples 1 to 5 and 7 printed using the Epson 680 printer. For example 5, the percentage of density loss was observed for the original density of 0.5. For the other examples, the percentage of density loss was observed for the original density of 1.

Letters K, C, M and Y represent the colors black, cyan, magenta and yellow respectively.

It may be seen that the inkjet recording elements according to the invention have very good dye keeping properties time.

5) Observation of the Surface Texture of the Recording Elements

The surface texture of the resulting recording elements was observed using a Philips XL30 Sfeg scanning Electron Microscope.

Observation of the receiving layer of the recording element according to example 5 shows that the surface is smooth, without aggregates.

Observation of the receiving layer of recording elements according to examples 1 to 4 and 6 and 7 shows that the surface is rough, constituted by aggregates whose size is between the values given in the following table II:

TABLE II

| Recording element | Aggregate size (μm) |
|---|---|
| Ex. 1 (inv.) | 0.6-2 |
| Ex. 2 (inv.) | 0.2-20 |
| Ex. 3 (inv.) | 0.5-4.5 |
| Ex. 4 (inv.) | 0.1-3 |
| Ex. 6 (inv.) | 0.4-2.5 |
| Ex. 7 (inv.) | 0.8-12 |

These results show that aggregates in the ink-receiving layer only form when the aluminosilicate polymer/chelating agent/hydrosoluble binder ternary system is used with a molar ratio between the chelating functions of the chelating agent and the aluminum of the aluminosilicate polymer greater than 1.

6) Gloss Evaluation

Gloss was measured for the various resulting recording elements using a Picogloss 560 apparatus (60° geometry) marketed by Erichsen.

The results are given below in Table III.

TABLE III

| Recording element | Gloss (%) |
|---|---|
| Ex. 1 (inv.) | 3 |
| Ex. 2 (inv.) | 3 |
| Ex. 3 (inv.) | 3 |
| Ex. 4 (inv.) | 3 |
| Ex. 5 (comp.) | 70 |
| Ex. 6 (inv.) | 3 |
| Ex. 7 (inv.) | 3 |

The results of table III show that the recording elements according to examples 1 to 4 and 6 and 7 are not glossy because of the formation of large aggregates in the ink-receiving layer. The recording element according to example 5 has good gloss because of the absence of aggregate.

7) Instant Dryness Assessment

For recording elements obtained according to examples 1, 5 and 6, the drying time of the ink after printing was assessed. To do this, targets, comprising four colors (black, yellow, cyan and magenta) were printed on each element using a KODAK PPM 200 printer and related ink, using the photographic quality printing settings. At the end of printing, a sheet of paper was immediately applied to the freshly printed target. The optical density of the transferred colors was then measured using the GretagMacbeth Spectrolino spectrophotometer and the value % Dry is deduced with the formula:

$$\%Dry = \left(1 - \frac{1 - 10^{-Dmes}}{1 - 10^{-Dref}}\right) \times 100$$

where $D_{mes}$ is the optical density measured on the image of the transferred target less $D_{min}$ (density of the resulting element not printed).

$D_{ref}$ is the optical density measured on a target printed on the sheet of ordinary paper less $D_{min}$.

The higher % Dry, the less the ink has transferred and the more the printing dried quickly. For a value of 100 percent, the printing is instantaneously dry.

Figure 4:
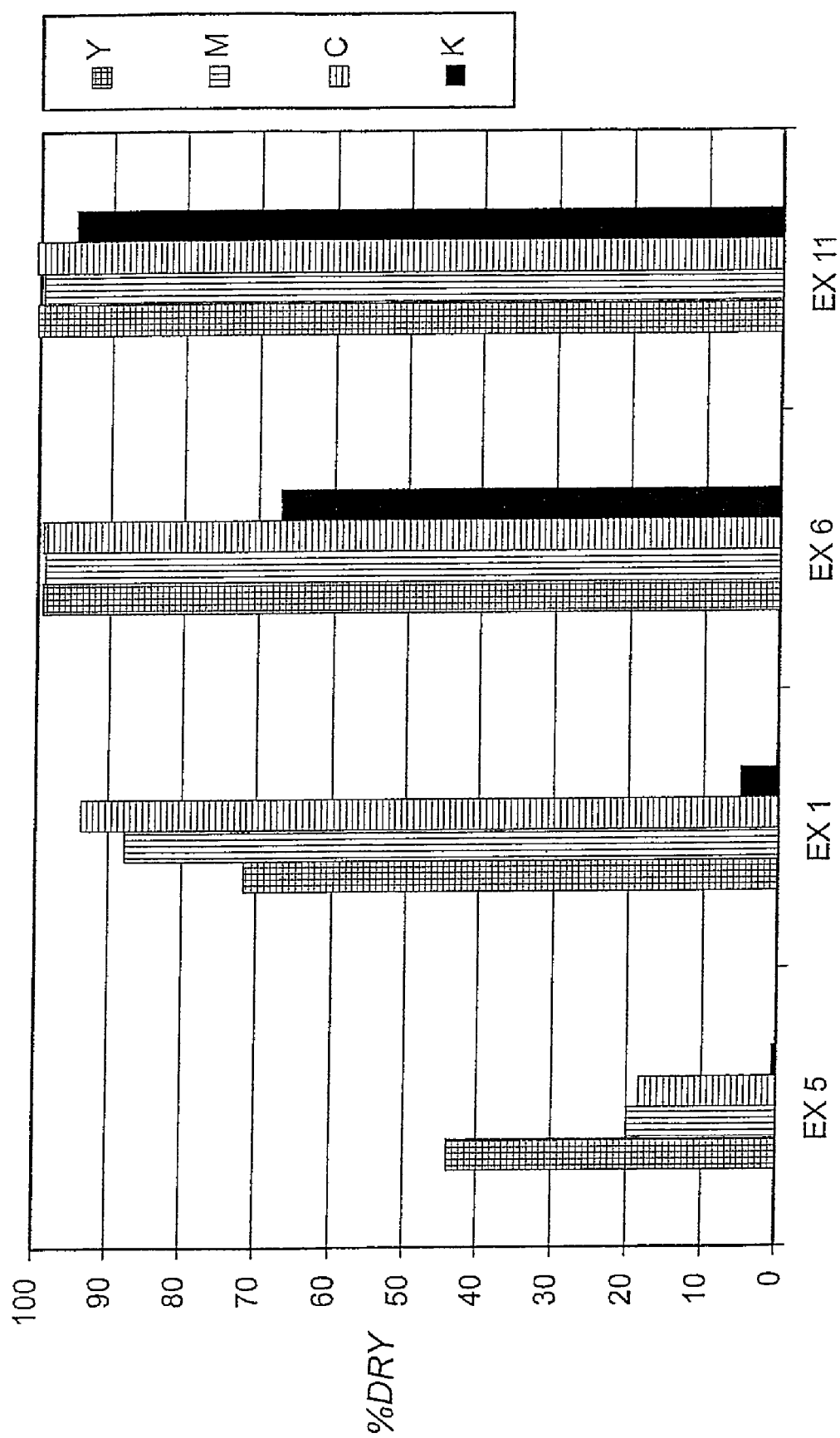
FIG. 4 represents the percentage of instantaneously dry ink for various comparative recording elements and according to the invention.

FIG. 4 represents the % dry value at the printer output for the recording elements obtained according to examples 1, 5 and 6. It may be seen that the recording element according to the comparative example 5, not having aggregate, has an ink drying time after printing much longer than that obtained for the recording elements according to the examples of the invention 1 and 6, having aggregates in the ink-receiving layer. The formation of aggregates enables the ink drying speed to be improved.

8) Reducing the Size of the Aggregates a) Effect of Dilution

Coating composition B as used for example 6 was reproduced (hydrosoluble binder: polyvinyl alcohol of molecular weight greater than 100,000, hydrolysis rate 86%, Gohsenol™ GH23 marketed by Nippon Gohsei), but by diluting the formulation of coating composition B and increasing the PVA/aluminosilicate polymer ratio).

Coating composition B was obtained by mixing:
- 10.5 g osmosed water
- 0.475 g glacial acetic acid (7.9 mmole)
- 1 g of aluminosilicate polymer of synthesis No. 1 (dry matter, 213 mg of aluminum, 7.9 mmole)
- 2.7 g polyvinyl alcohol at 9% (PVA/aluminosilicate polymer ratio=0.25)

When the aluminosilicate polymer has powder form, the particles must first be crushed finely. The mixture was homogenized by shearing overnight.

The recording element was prepared as described in paragraph 3, with a wet thickness of 300 μm. The recording element according to example 8 was obtained.

The surface texture of the example 8 element was observed as described in paragraph 5. It showed that the surface is rough, constituted of aggregates whose size is between 0.3 and 0.6 μm.

The gloss of the recording elements was measured as described in paragraph 6.

The element according to example 8 has a gloss of 25%.

These results show that the use of a higher quantity of polyvinyl alcohol and the dilution of the formula enable the production of smaller size aggregates. Consequently, the gloss of the ink-receiving layer is improved compared with example 6 produced with less polyvinyl alcohol and a less diluted formulation.

b) Effect of Molecular Weight and Hydrolysis Rate of the Hydrosoluble Binder

In these examples, the coating composition was obtained directly by mixing the chelating agent and the aluminosilicate polymer obtained by the synthesis No. 1 at the time of preparing the coating composition before coating, with a molar ratio between the chelating functions of the chelating agent and the aluminum of the aluminosilicate polymer of 1.

Polyvinyl alcohol of low molecular weight 22,000-25,000, hydrolysis rate 88% (marketed by Alfa Aesar) diluted 9% by weight in osmosed water for example 9 was used as hydrosoluble binder, and polyvinyl alcohol of low molecular weight 22,000-25,000, hydrolysis rate 98% (marketed by Alfa Aesar) diluted 9% by weight in osmosed water for examples 10 and 11. The receiving agent was the aluminosilicate polymer prepared according to synthesis No. 1 and the chelating agent was acetic acid.

The coating compositions for examples 9 and 10 were obtained by mixing:
- 6.8 g osmosed water
- 0.71 g glacial acetic acid (11.8 mmole)
- 1.5 g of aluminosilicate polymer of synthesis No. 1 (dry matter, 320 mg of aluminum, 11.8 mmole)
- 2 g polyvinyl alcohol at 9% (PVA/aluminosilicate polymer ratio=0.12)

The coating composition for example 11 was obtained by mixing:
- 4.7 g osmosed water
- 0.32 g glacial acetic acid (5.3 mmole)
- 0.673 g of aluminosilicate polymer of synthesis No. 1 (dry matter, 143 mg of aluminum, 5.3 mmole)
- 1.88 g polyvinyl alcohol at 9% (PVA/aluminosilicate polymer ratio=0.25)

The formulation of the coating composition of example 11 was more diluted than that of example 10 and the PVA/aluminosilicate polymer ratio is higher.

When the aluminosilicate polymer has powder form, the particles must first be crushed finely. The mixture was homogenized by shearing overnight.

The recording elements according to examples 9 to 11 were prepared as described in paragraph 3, with a wet thickness of 200 μm for examples 9 and 10, and 300 μm for example 11.

The dye keeping properties in time was assessed as described in paragraph 4.

Figure 5:
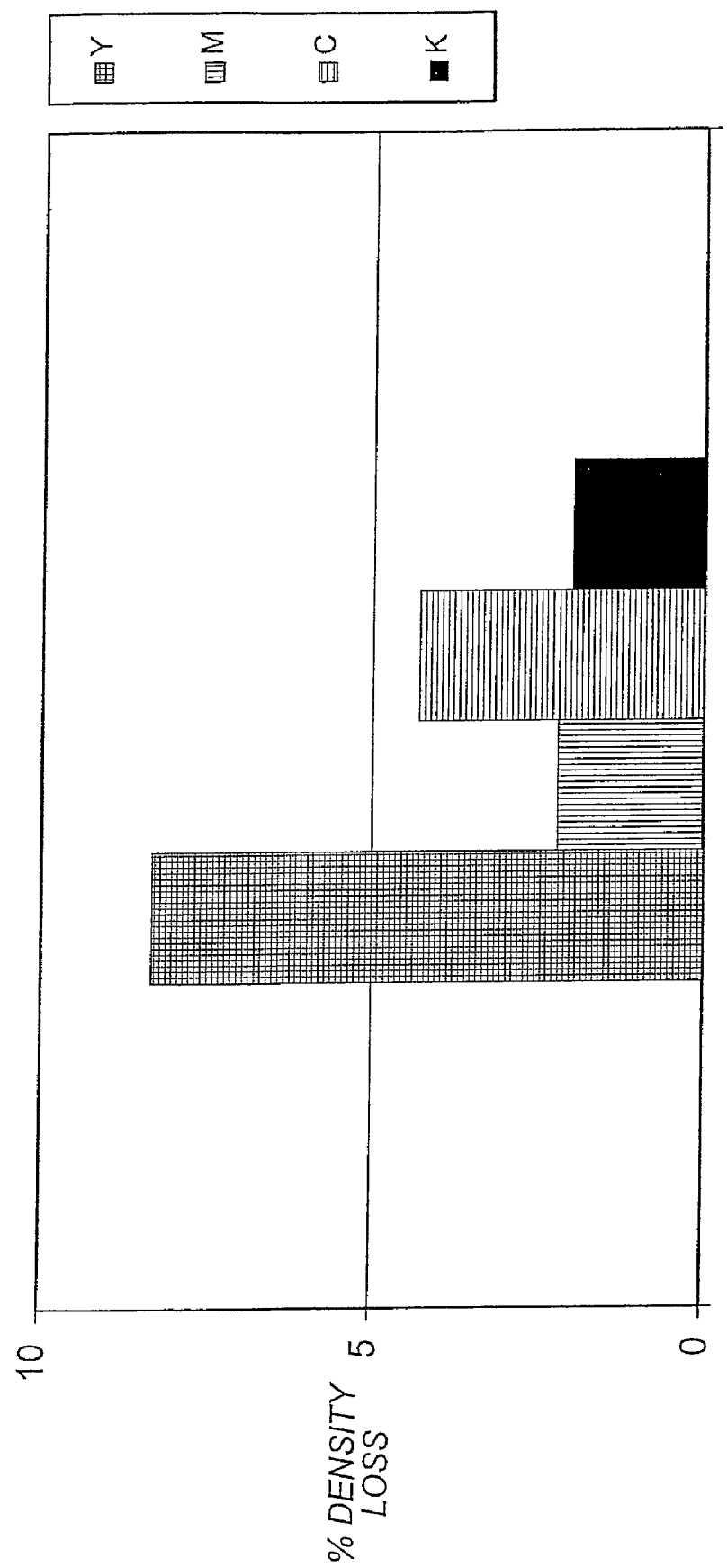

FIG. 5 represents the percentage of density loss observed for the original density at 1 for the four colors of the target after three weeks for example 10 printed with the Kodak PPM 200 printer.

Figure 6:
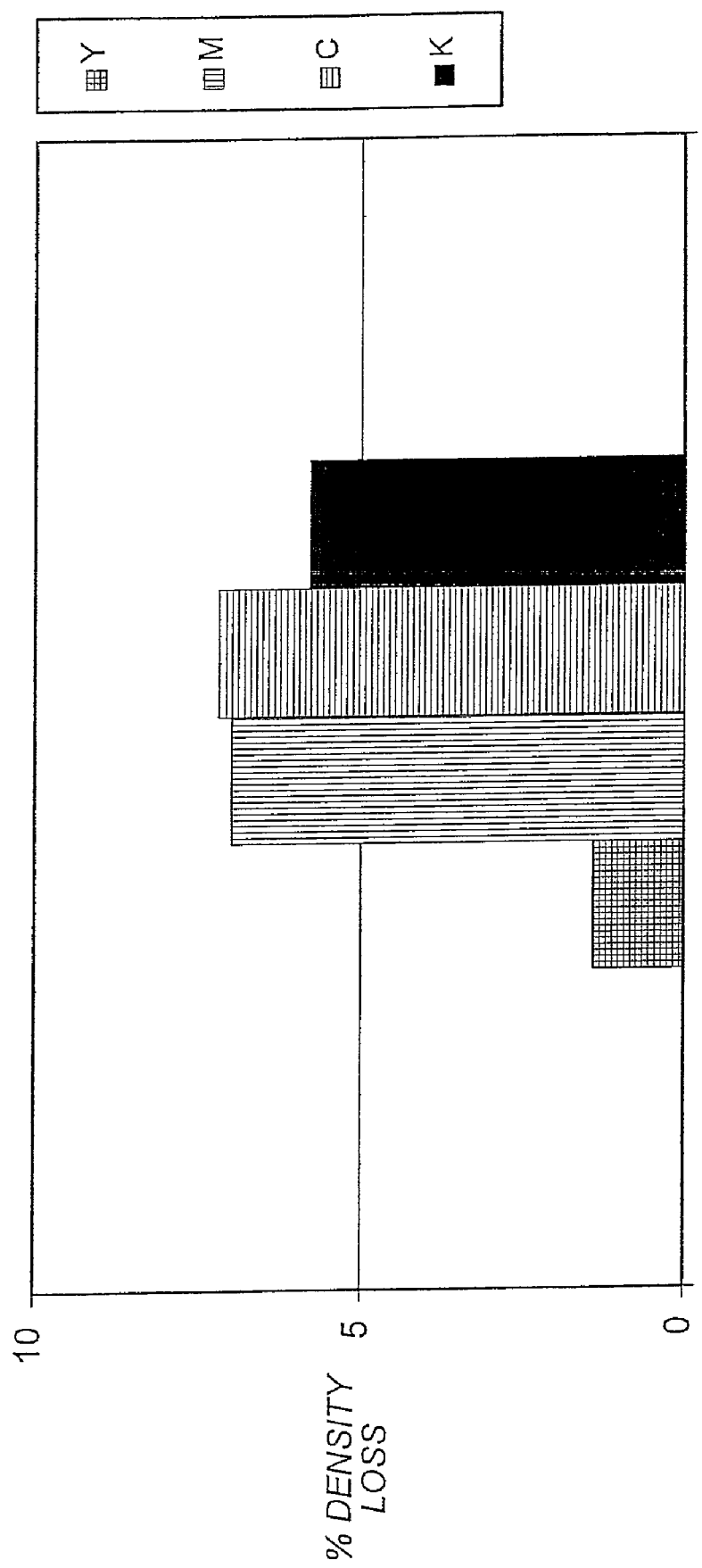

FIG. 6 represents the percentage of density loss observed for the is original density at 1 for the four colors of the target after three weeks for example 10 printed with the Epson 680 printer.

It may be seen that the example 10 element according to the invention has very good dye keeping properties in time.

The surface texture of the resulting recording elements was observed as described in paragraph 5, the gloss of the elements was measured as described in paragraph 6.

The results are given in Table IV.

TABLE IV

| Recording element | PVA molecular weight | Hydrolysis rate | Aluminosilicate polymer/PVA | Surface texture | Aggregate size (μm) | Gloss (%) |
| --- | --- | --- | --- | --- | --- | --- |
| Ex. 6 (inv.) | >100,000 | 86% | 0.12 | Rough surface. aggregates | 0.4-2.5 | 3 |
| Ex. 9 (inv.) | 22,000-25,000 | 88% | 0.12 | Surface not smooth | — | 20 |
| Ex. 10 (inv.) | 22,000-25,000 | 98% | 0.12 | Rough surface. aggregates | 0.4-0.5 | 28 |
| Ex. 11 (inv.) | 22,000-25,000 | 98% | 0.25 | Rough surface. aggregates | 0.2-0.4 | 50 |

These results show that the use of a polyvinyl alcohol with a low molecular weight and high hydrolysis rate enable the production of smaller size aggregates. Consequently, the gloss of the ink-receiving layer is improved compared with example 6 produced with polyvinyl alcohol of high molecular weight.

Furthermore, the results of examples 10 and 11 confirm, as shown in paragraph 8a), that dilution of the formulation and increase of the PVA/aluminosilicate polymer ratio enable the aggregate size to be reduced even more and thus the gloss of the ink-receiving layer to be increased.

FIG. 4 represents the % dry value at the printer output for the element obtained according to example 11. The drying speed for example 11 is still excellent even though the receiving layer of example 11 has smaller size aggregates than those of examples 1 and 6. For example 11, the printing is instantaneously dry. Example 11 gives a good compromise for the aggregate size, enabling a good drying speed and good gloss to be obtained.

The invention claimed is:

1. An inkjet recording element comprising a support and at least one ink-receiving layer, characterized in that said ink-receiving layer comprises at least one hydrosoluble binder and at least one aluminosilicate polymer obtainable by a preparation method that comprises the following steps:
   a) treating a mixed aluminum and silicon alkoxide only comprising hydrolyzable functions, or a mixed aluminum and silicon precursor resulting from the hydrolysis of a mixture of aluminum compounds and silicon compounds only comprising hydrolyzable functions, with an aqueous alkali, in the presence of silanol groups, the aluminum concentration being maintained at less than 0.3 mol/l, the Al/Si molar ratio being maintained between 1 and 3.6 and the alkali/Al molar ratio being maintained between 2.3 and 3;
   b) stirring the mixture resulting from step a) at ambient temperature of between 15° C. and 35° C. in the presence of silanol groups long enough to form the aluminosilicate polymer, and, directly after step (b);
   c) eliminating the byproducts formed during steps a) and b) from the reaction medium; and
   d) adding at least one chelating agent of aluminum to the aluminosilicate polymer, the molar ratio between the chelating functions of the chelating agent and the aluminum of the aluminosilicate polymer being greater than or equal to 1.

2. The recording element according to claim 1, wherein the alkali of step a) to prepare the aluminosilicate polymer is selected from the group consisting of sodium, potassium, or lithium hydroxide, diethylamine and triethylamine.

3. The recording element according to claim 1, wherein the silanol groups used to prepare the aluminosilicate polymer are supplied as silica or glass beads.

4. The recording element according to claim 1, wherein the aluminum concentration used to prepare the aluminosilicate polymer is maintained between $1.5 \times 10^{-2}$ and 0.3 mol/l.

5. The recording element according to claim 1, wherein the aluminum concentration used to prepare the aluminosilicate polymer is maintained between $4.4 \times 10^{-2}$ and 0.3 mol/l.

6. The recording element according to claim 1, wherein said alkali/Al molar ratio to prepare the aluminosilicate polymer is about 2.3.

7. The recording element according to claim 1, wherein said alkali/Al molar ratio to prepare the aluminosilicate polymer is about 3.

8. The recording element according to claim 1, wherein the method for preparing the aluminosilicate polymer comprises, after step b) and before step c), a step e), by which alkali is added in order to reach an alkali/Al molar ratio of 3 if this ratio has not already been reached in step a).

9. The recording element according to claim 1, wherein the mixed aluminum and silicon precursor resulting from hydrolysis of a mixture of aluminum compounds and silicon compounds only having hydrolyzable functions is a product resulting from the mixture in an aqueous medium (i) of a compound selected from the group consisting of aluminum salts, aluminum alkoxides and aluminum halogenoalkoxides and (ii) at least one compound selected from the group consisting of silicon alkoxides and chloroalkoxides only having hydrolyzable functions.

10. The recording element according to claim 9, wherein said mixed aluminum and silicon precursor is the product resulting from the mixture (i) of an aluminum halide and (ii) a silicon alkoxide only having hydrolyzable functions.

11. The recording element according to claim 10, wherein said silicon alkoxide only having hydrolyzable functions is tetramethyl orthosilicate or tetraethyl orthosilicate.

12. The recording element according to claim 1, wherein step d) is directly applied to the aluminosilicate polymer resulting from step b) or from step c) or at the time of the preparation of the coating composition for the ink-receiving layer from an aluminosilicate polymer resulting from step c).

13. The recording element according to claim 1, wherein the chelating agent of aluminum is selected from the group consisting of carboxylic acids, phosphonic acids, phosphinic acids, sulfonic acids, difunctional acids, their esters and anhydrides, and amino acids.

14. The recording element according to claim 13, wherein said chelating agent of aluminum is selected from the group consisting of HCOOH, $R_1$COOH, where $R_1$ is selected from the group consisting of $CH_3(CH_2)_n$, n being between 0 and 12, $CF_3$, $C_6H_5$, $(C_6H_5)_2$, substituted aromatic rings, $C_4H_4S$; $R_2PO(OH)_2$ where $R_2$ is selected from the group consisting of $CH_3$, $C_6H_5$; $R_3SO_3H$ where $R_3$ is $CH_3(CH_2)_n$, n being between 0 and 5; $HOOC(CH_2)COOH$, n=0-8; aromatic difunctional acids; $HOOC(CH_2)_nPO(OH)_2$, n=2, 4; aliphatic hydroxy acids; $HOOC(CH_2OH)_nCOOH$, n=1-2; $CH_3CH(NH_2)COOH$.

15. The recording element according to claim 1, wherein step d) comprises a first adding of acetic acid and a following adding of another chelating agent of aluminum.

16. The recording element according to claim 1, wherein said ink-receiving layer comprises between 5 and 95 percent by weight of aluminosilicate polymer compared with the total weight of the dry ink-receiving layer.

17. The recording element according to claim 1, wherein the hydrophilic binder is gelatin or polyvinyl alcohol.

* * * * *

UNITED STATES PATENT AND TRADEMARK OFFICE
CERTIFICATE OF CORRECTION

PATENT NO. : 7,632,555 B2 Page 1 of 1
APPLICATION NO. : 10/583528
DATED : December 15, 2009
INVENTOR(S) : Desrousseaux et al.

It is certified that error appears in the above-identified patent and that said Letters Patent is hereby corrected as shown below:

On the Title Page, Item (30): delete Foreign Application Priority Data (FR) number "03 1495" and insert -- 0314956 --.

Column 16, line 40, Claim 14, delete "HOOC(CH$_2$)COOH," and insert -- HOOC(CH$_2$)$_n$COOH, --.

Signed and Sealed this

Ninth Day of February, 2010

David J. Kappos
*Director of the United States Patent and Trademark Office*